G. W. BOWERS.
HAIR SPRING GAGE.
APPLICATION FILED JAN. 22, 1909.
945,441.
Patented Jan. 4, 1910.
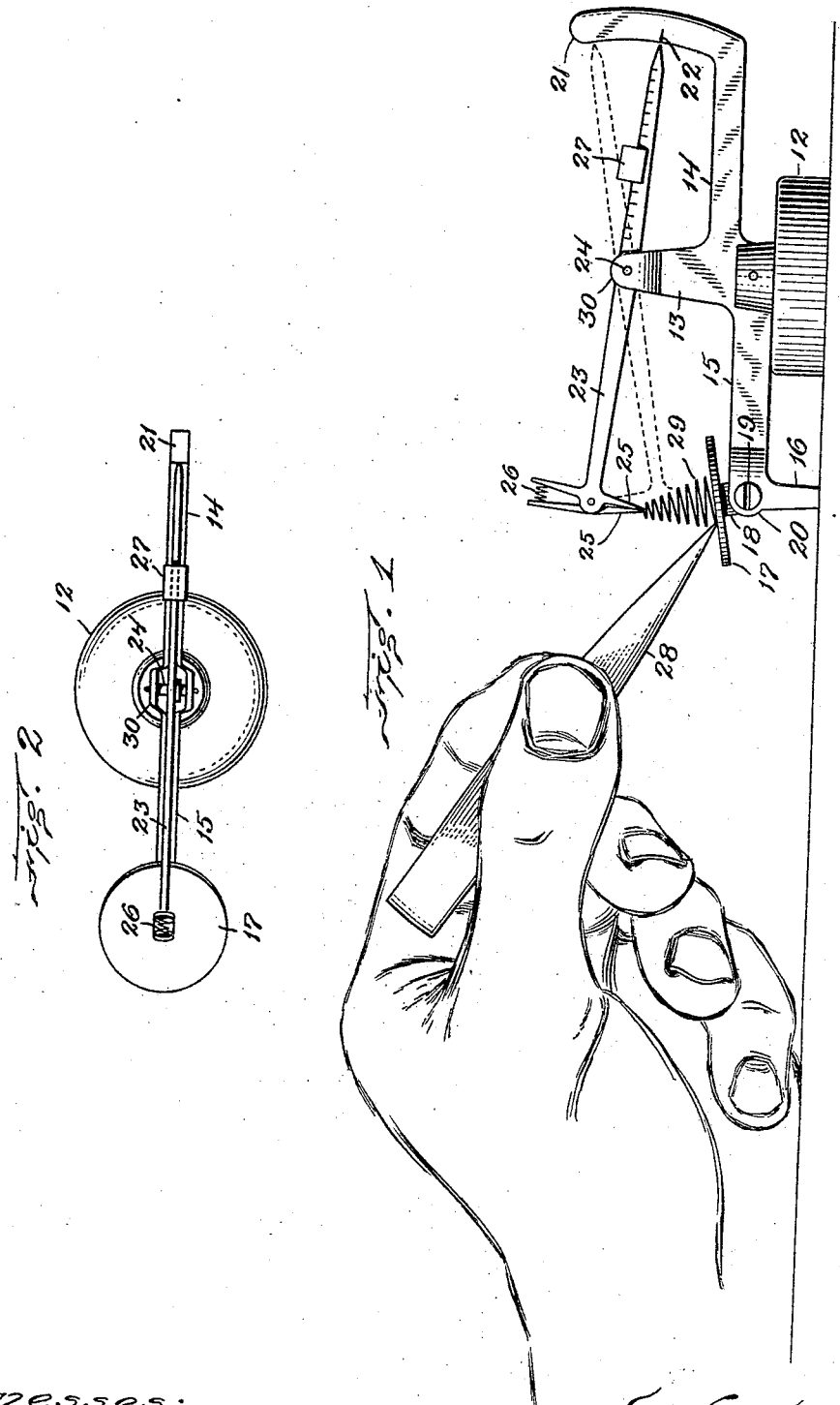

UNITED STATES PATENT OFFICE.

GEORGE W. BOWERS, OF SOMERVILLE, MASSACHUSETTS, ASSIGNOR, BY MESNE ASSIGNMENTS, TO HAMMEL, RIGLANDER & CO., OF NEW YORK, N. Y., A CORPORATION OF NEW YORK.

HAIR-SPRING GAGE.

945,441.  Specification of Letters Patent.  Patented Jan. 4, 1910.

Application filed January 22, 1909. Serial No. 473,726.

*To all whom it may concern:*

Be it known that I, GEORGE W. BOWERS, of Somerville, in the county of Middlesex and State of Massachusetts, have invented certain new and useful Improvements in Hair-Spring Gages, of which the following is a specification.

This invention has for its object to provide a device for the use of watchmakers or repairers in testing a watch hair spring in order to determine the degree of force or resilience possessed by it, and it consists in the improvements which I will now proceed to describe and claim.

Of the accompanying drawings, forming a part of this specification,—Figure 1 represents a side elevation of a hair spring gage embodying my invention. Fig. 2 represents a top plan view of the same.

The same reference characters indicate the same parts in both figures.

My improved hair spring gage comprises a supporting frame which is preferably composed of a weighted base portion 12, and a body portion which includes a central standard 13 projecting upwardly from the base, and arms 14 and 15 projecting in opposite directions from the base and from said standard. The arm 15 is provided with a hook 16 adapted to rest on the bench supporting the base 12.

17 represents a spring supporting member or rest which is preferably a flat disk having a shank 18 which is secured by a screw 19 to the arm 15, said arm being preferably provided with ears 20 separated by a space which receives the shank 18, the screw 19 passing through said ears and through a hole in the shank. When the screw is tightened, the supporting member 17 is firmly secured. The outer end of the arm 14 is provided with an upwardly projecting ear or extension 21 which constitutes an indicator member provided with a mark or graduation 22 for a purpose hereinafter described.

23 represents a lever which is pivoted at 24 to the standard 13. One arm of the said lever is provided with means for engaging the inner end of a spirally coiled hair spring, said means being preferably a pair of jaws 25 pivotally connected and normally closed by means of a spring 26. The other arm of the lever is graduated, and is formed as a pointer adapted to register with the mark 22 as shown in Fig. 1. 27 represents a weight which is adapted to slide upon the pointer arm.

The described device is operated as follows:—The operator grasps the outer end of the hair spring 29 to be tested with a pair of nippers or tweezers 28 and holds it in contact with the supporting member or rest 17. The jaws 25 are then engaged with the inner end of the spring. When the jaws are first engaged with the inner end of the spring, the weight 27 is moved inwardly to the inner portion of the graduated arm. The operator now moves the weight along the graduated arm until the force of the weight upon the arm is sufficient to depress the pointed outer end of the arm to the mark 22 on the indicator member. The movement of the weight required to produce this result depends upon the force or resilience of the spring, which is indicated by the extent of movement of the weight, and by the graduations on the weight-carrying arm of the lever 23. This completes the operation, the spring being then removed.

The body portion of the frame may be composed of sheet metal layers or sections suitably united, portions of said layers being offset from each other to form the ears 20 on the arm 15, and ears 30 at the upper end of the standard 13, the lever 23 being inserted between said ears and the pivot 24 passing through the ears and the lever.

It will be seen that the device is of simple construction and is adapted to be rapidly operated.

I claim:

1. A hair spring gage comprising a frame having a spring-supporting member and a marked indicator member, a lever pivoted to the frame between said members, one arm of the lever being graduated and constituting a pointer adapted to register with the mark on the indicator member, an adjustable weight on the graduated arm, and spring-closed jaws on the other arm, located adjacent to the spring-supporting member and adapted to engage one end of a hair spring.

2. A hair spring gage comprising a frame having a weighted base portion, and a body portion attached centrally to the base, and composed of a central standard rising from the base, and arms projecting in opposite directions from the standard and base, one of said arms having an indicator member, while the other arm has a downwardly projecting leg, a spring-supporting member attached to the frame above said leg, and a lever pivoted to said standard, and having a graduated arm adapted to coöperate with the indicator member, and an adjustable weight on said arm, the other arm of the lever having means for engaging one end of a hair spring.

In testimony whereof I have affixed my signature, in presence of two witnesses.

GEORGE W. BOWERS.

Witnesses:
C. F. BROWN,
P. W. PEZZETTI.